United States Patent Office 3,368,503
Patented Feb. 13, 1968

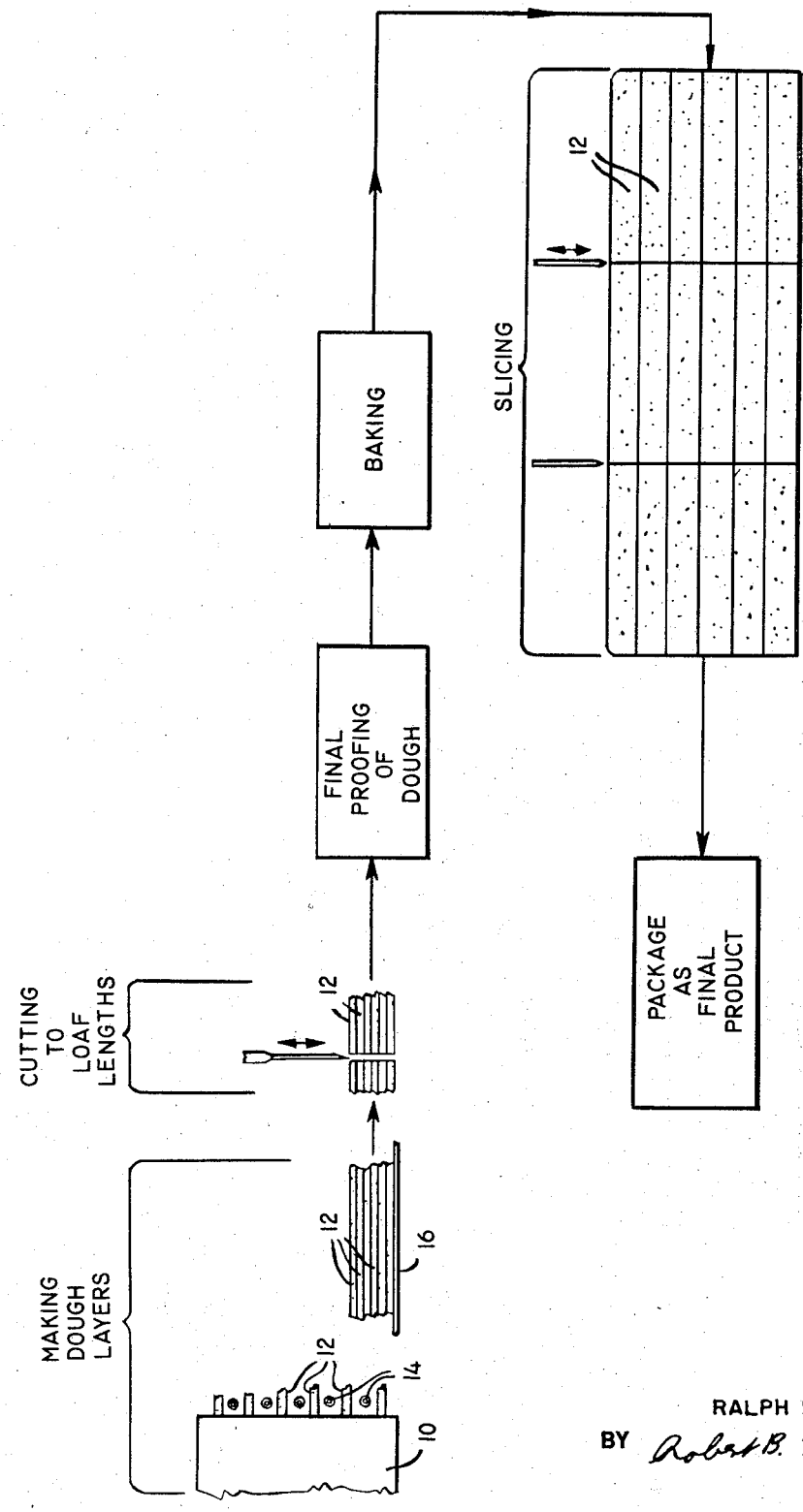

3,368,503
PROCESS FOR MAKING BREAD LOAVES
Ralph E. Gaylord, Edina, Minn., assignor to General
Mills, Inc., a corporation of Delaware
Filed Oct. 8, 1965, Ser. No. 494,083
4 Claims. (Cl. 107—54)

The present invention relates to a method of making bread loaves.

It is an object of the present invention to provide an improved process for making bread loaves which are especially convenient to use and are advantageously arranged, and which are especially well adapted to be made as brown and serve or frozen bread loaves.

It is a further object to provide a bread making process wherein sheeted dough can be used in an especially effective manner in the making of bread loaves.

It is yet a further object to provide such a process where the resulting bread loaf is so arranged that mold contamination in the same is better retarded in comparison with bread made according to conventional processes.

Also it is an object to provide such a process wherein the bread loaves made thereby are such that the loss of flavor and moisture content of the bread loaves is retarded in comparison with bread made according to conventional bread making processes.

Further, it is an object to provide a bread loaf wherein the individual slices have a smooth surface texture well adapted to receive butter or other materials which can be spread on bread slices.

Another object is to provide such a process whereby the resulting bread loaves are such that bread pieces or slices are of an even size and can easily be removed therefrom without disturbing the other bread pieces.

These and other objects and features of the invention will be more readily understood and appreciated from the following detailed description of the preferred embodiment thereof selected for purposes of illustration and shown in the accompanying drawing, in which:

The figure is a schematic drawing illustrating the process of the present invention.

According to conventional bread making processes, the various ingredients for the bread (i.e., flour, yeast, salt and water, with additions of fats or other related substances, sometimes also with yeast foods and malt) are made into a developed dough. This developed dough can be made in various ways. For example, the bread ingredients can be mixed and permitted to stand for a certain period, this being called a period of "bulk fermentation." Or some of the ingredients can, along with the water called for in the bread formulation, be mixed into a liquid substance called a "brew," which is then combined with the rest of the bread ingredients and fed through a developing machine to make a developed dough. This developed dough, if made according to the batch process, is formed into lumps which go through an intermediate proofing period, after which the dough lumps are formed into their final bread configuration then to go through a period of final proofing. After this, the dough loaves are baked to form the finished bread loaves. If a developed dough is made by means of a mechanical developer, the dough is usually taken from the developer and placed directly into baking pans to go through the period of final proofing, after which the dough loaves are baked into finished bread loaves. These loaves (however made) are then most often sliced and packaged, and then shipped to stores to be sold on the retail market.

Some effort has been made in the baking industry to make bread loaves of the brown and serve (commonly referred to as "brown 'n serve") variety. Such bread loaves are sold to the consumer public as partially baked loaves, which can be placed in an oven to complete the baking thereof, and then be served freshly baked. Another speciality type bread product is frozen bread loaves which are either partially or totally baked, and which the ultimate consumer can place in an oven to complete the baking thereof, or in the case of the fully baked loaves to heat the same, so that an oven fresh loaf can be served. While such brown 'n serve or frozen products have been somewhat successful with some other dough products, such as rolls and biscuits, this same degree of commercial success has not been present with bread products. It is believed that one of the main contributing factors to this lack of success is the fact that such brown and serve or frozen bread loaves (as they are now made) are subject to the inconvenience that as a practical matter they are sliced subsequent to the baking or warming thereof. It has been possible, with rolls and biscuit products, to make the same in a manner that after baking, portions of the rolls or biscuits may be easily broken off along faces where the rolls or biscuits are provided with a separating medium. However, until now it has not been possible to apply successfully to a bread loaf product these same particular techniques by which rolls and biscuits are so made. Prior art attempts along this line have resulted in bread pieces which are irregular and uneven and do not simulate conventional bread slices very closely.

Thus, it may be stated as an additional particular object to provide a process for making bread of a brown and serve or frozen variety, which can after its final baking or warning be easily broken into relatively uniform pieces corresponding quite closely in shape and size to conventional slices of bread.

A preferred embodiment of the present invention is illustrated diagrammatically in FIGURE 1. The first step is to take a developed dough and form this dough into a plurality of ribbons (e.g., about nine ribbons), the width of which corresponds to the width of a dough loaf ready for final proofing (i.e., about 4 to 5 inches), and the thickness of which is such that after the dough expands through the period of final proofing and baking, the thickness of the horizontal individual dough ribbons will correspond to that desired for the thickness of a final bread slice or piece. It has been found that if the dough ribbons are formed with a thickness of about $\frac{1}{10}$ of an inch, the final thickness of the resulting bread layers will be of a desired thickness of about ½ inch. The ribbons of dough are layed one on top of the other, with an oil or other suitable separating medium place between the adjoining layers of dough. This is done so that after the final proofing and baking of the product, the layers maintain their separate identity and can easily be separated one from the other. While within the broader aspects of the present invention, it is possible to form the dough into ribbons in any suitable manner, e.g., by being passed through sheeting rolls, it is especially effective to extrude the developed plurality of ribbons (e.g., about nine ribbons), the width dough through slot-like orifices disposed one above the other so that the dough ribbons or layers are formed in overlying layers. With such an arrangement, as the dough ribbons are formed, suitable spray means or other applicating means are provided to apply the desired oil or other separating medium onto adjacent surfaces of the dough ribbon material. (This particular arrangement is shown schematically in FIGURE 1, wherein there is an extruder 10 which extrudes a plurality of dough ribbons 12 disposed horizontally one above the other. A number of applicators 14 spread oil between adjacent dough ribbons, and a conveyor 16 carries the dough ribbons from the extruder 10.)

The dough ribbons laying one on top of the other are then cut transversely into lengths, each of which corresponds roughly to the length of a conventional dough loaf before final proofing. These dough lengths (which can be called dough loaves) are then subject to a period of final proofing. Conventionally, this final proofing is accomplished by permitting the dough loaf to remain at a controlled temperature of 80° to 110° F. for about 45 minutes, and this method of final proofing would be suitable for use in the present invention.

The proofed loaves of dough are then baked, and this can be done in a conventional manner, as by being placed in a baking oven for a period of about 20–30 minutes, the temperature in the oven being about 400° F. to 425° F. Or, if it is desired to make partially baked frozen or brown and serve loaves, the baking of which can be completed by the ultimate consumer, the bread can be placed in an oven at about 280° to 300° F. for a period of about one half or three quarters of an hour to become a partially baked loaf. A quite desirable method of baking the bread (especially if the bread is only to be partially baked) is by means of a microwave oven, this being disclosed in a pending application, assigned to the assignee of the present invention, entitled "Bread Making Process," Ser. No. 414,391, filed Nov. 27, 1964.

After this baking step, the bread loaf is cut transversely into lengths which correspond roughly to the height of a conventional loaf of bread (i.e., about 4 to 5 inches). The dough loaf is then packaged and is ready for use by the final consumer. Thus the final loaf configuration or arrangement is essentially that of several stacks of bread with each stack being formed of a number of dough pieces loosely bonded to one another, each piece being approximately square and similar in size and shape to a conventional slice of bread.

If the bread loaf is fully baked, the user merely opens the package and removes one of the pieces which is horizontally disposed in one of the several stacks of such pieces. The bread pieces separate easily from one another, and the surface of such a piece is smooth, has substantially no holes, has a very even uniform grain, and has a silky, moist texture. Also the bread surface is such that butter, jelly or some other suitable material can be spread thereon with relatively greater ease. With the sliced or cut surface areas being only along the end edge of the bread pieces (either on one or two of the edge portions of the piece depending on which stack the piece is in), the bread has much less tendency to lose its flavor and moistness, since the lubricating adjoining surfaces of the bread (which become exposed surface when the pieces are broken off) retard transfer therethrough of its moisture and flavor contributing ingredients. Also since cut surface area is more susceptible to the effect of molds, these pieces have less tendency to spoil.

If the final product is a partially baked bread loaf of the frozen or brown and serve variety, the user places one or more of the bread stacks (or a portion of a stack) in an oven and completes the baking of the same. Then the bread slices can be "peeled off" as described above. Thus, after the user has completed baking the bread, it can be used hot or cold and there is no necessity of slicing the bread since it has already been preformed into slice-like pieces.

It should be understood that the foregoing is merely illustrative of a certain embodiment of the invention and many variations may be made by those skilled in the art without departing from the spirit and scope of the invention.

Now therefore I claim:
1. A bread making process, comprising:
    (a) forming a plurality of ribbons of dough which overlie one another in layers and have a separating medium between adjacent layers of said dough,
    (b) cutting said ribbons transversely into a loaf length,
    (c) final proofing said loaf length of dough,
    (d) performing a baking operation on said loaf length of dough, and
    (e) cutting said loaf length transversely to make from said loaf length stacks of bread pieces corresponding in size and shape to conventional bread slices.

2. The process as recited in claim 1, wherein in said baking operation said loaf length is baked to completion to form a finished bread loaf.

3. The process as recited in claim 1, wherein said loaf length is baked partially, so that the baking of said loaf length can be completed at a later time.

4. The process as recited in claim 1, wherein said ribbons are formed by extruding said ribbons and applying a separating medium between adjacent ribbons.

References Cited

UNITED STATES PATENTS

| | | | |
|---|---|---|---|
| 1,319,899 | 10/1919 | Rafert | 99—86 |
| 1,882,139 | 10/1932 | Giuffre | 99—86 |
| 1,929,358 | 10/1933 | Keefer | 107—54.2 |
| 2,045,228 | 6/1936 | Harber et al. | 99—86 X |
| 2,888,887 | 6/1959 | Wolf | 99—86 X |
| 2,549,595 | 4/1951 | Gregor | 99—90 |
| 3,161,523 | 12/1964 | Ort | 99—90 |

OTHER REFERENCES

Voorhees: "How To Increase Brown 'N Serve Bread Sales," Bakers Weekly, Apr. 5, 1965, pages 14, 15.

A. LOUIS MONACELL, *Primary Examiner.*

J. M. GOLIAN, *Assistant Examiner.*

UNITED STATES PATENT OFFICE
CERTIFICATE OF CORRECTION

Patent No. 3,368,503　　　　　　　　　　　　　　February 13, 1968

Ralph E. Gaylord

It is certified that error appears in the above identified patent and that said Letters Patent are hereby corrected as shown below:

Column 2, line 30, "warning" should read -- warming --; line 55, cancel "plurality of ribbons (e.g., about nine ribbons), the width".

Signed and sealed this 28th day of October 1969.

(SEAL)
Attest:

Edward M. Fletcher, Jr.　　　　　　　　WILLIAM E. SCHUYLER, JR.
Attesting Officer　　　　　　　　　　　　Commissioner of Patents